（12）United States Patent
Werner et al.

(10) Patent No.: US 10,442,243 B2
(45) Date of Patent: Oct. 15, 2019

(54) METHOD FOR PRODUCING A WHEEL RIM WITH A RIM BASE OF FIBER COMPOSITE MATERIAL

(71) Applicant: THYSSENKRUPP CARBON COMPONENTS GMBH, Wilsdruff STT Kesselsdorf (DE)

(72) Inventors: Jens Werner, Coswig (DE); Christian Koehler, Dresden (DE); Sandro Maeke, Dohma (DE); Michael Dressler, Dresden (DE); Andre Bartsch, Dresden (DE)

(73) Assignee: THYSSENKRUPP CARBON COMPONENTS GMBH, Wilsdruff Stt Kesseldorf (DE)

( * ) Notice: Subject to any disclaimer, the term of this patent is extended or adjusted under 35 U.S.C. 154(b) by 526 days.

(21) Appl. No.: 15/103,967

(22) PCT Filed: Dec. 12, 2014

(86) PCT No.: PCT/DE2014/100445
§ 371 (c)(1),
(2) Date: Jun. 13, 2016

(87) PCT Pub. No.: WO2015/090276
PCT Pub. Date: Jun. 25, 2015

(65) Prior Publication Data
US 2016/0311252 A1 Oct. 27, 2016

(30) Foreign Application Priority Data
Dec. 18, 2013 (DE) .................. 10 2013 114 343

(51) Int. Cl.
*B29C 70/46* (2006.01)
*B60B 21/00* (2006.01)
(Continued)

(52) U.S. Cl.
CPC ............ *B60B 21/00* (2013.01); *B29C 70/462* (2013.01); *B29C 70/78* (2013.01); *B29C 70/86* (2013.01);
(Continued)

(58) Field of Classification Search
None
See application file for complete search history.

(56) References Cited

U.S. PATENT DOCUMENTS 4,294,490 A * 10/1981 Woelfel ............... B29C 53/60
301/64.703
4,294,639 A * 10/1981 Woelfel ............... B29C 53/60
156/185

(Continued)

FOREIGN PATENT DOCUMENTS

AU 524458 B2 9/1982
CN 101528478 A 9/2009
(Continued)

*Primary Examiner* — Edmund H Lee
(74) *Attorney, Agent, or Firm* — thyssenkrupp North America, Inc.

(57) ABSTRACT

The invention relates to a method for producing a wheel rim having a rim base of a fiber composite material. The problem to be solved by the invention is that of improving the production of the wheel rim, and especially to ensure a reliably functioning wheel structure which can be achieved with little financial and technical outlay. The problem is solved in that during the production of the rim base (2) a connection element (3, 13, 21, 31, 42, 51) is joined to the rim base (2), said connection element (3, 13, 21, 31, 42, 51) being designed and arranged in such a way that a wheel disc (4, 14, 22, 36, 45) can be connected to said connection element (3, 13, 21, 31, 42, 51).

19 Claims, 10 Drawing Sheets

(51) Int. Cl.
   *B60B 3/04*      (2006.01)
   *B60B 5/02*      (2006.01)
   *B60B 23/06*     (2006.01)
   *B60B 23/10*     (2006.01)
   *B29C 70/86*     (2006.01)
   *B29C 70/78*     (2006.01)
   *B29L 31/32*     (2006.01)
   *B29K 105/08*    (2006.01)
   *B29K 307/04*    (2006.01)
   *B29K 705/12*    (2006.01)

(52) U.S. Cl.
   CPC .............. *B60B 3/041* (2013.01); *B60B 3/045* (2013.01); *B60B 5/02* (2013.01); *B60B 23/06* (2013.01); *B60B 23/10* (2013.01); *B29K 2105/08* (2013.01); *B29K 2307/04* (2013.01); *B29K 2705/12* (2013.01); *B29L 2031/32* (2013.01); *B60B 2310/204* (2013.01); *B60B 2310/30* (2013.01); *B60B 2310/80* (2013.01); *B60B 2360/34* (2013.01); *B60B 2360/341* (2013.01); *B60B 2900/10* (2013.01); *B60B 2900/111* (2013.01); *B60B 2900/112* (2013.01); *B60B 2900/20* (2013.01); *B60B 2900/212* (2013.01); *B60B 2900/30* (2013.01); *B60B 2900/321* (2013.01); *B60B 2900/325* (2013.01); *B60Y 2200/10* (2013.01); *Y02T 10/86* (2013.01)

(56) References Cited

U.S. PATENT DOCUMENTS

| | | | |
|---|---|---|---|
| 4,376,749 A * | 3/1983 | Woelfel | B29C 53/60 |
| | | | 156/184 |
| 5,899,538 A | 5/1999 | Tatraux-Paro et al. | |
| 5,997,102 A | 12/1999 | Stanavich | |
| 6,296,320 B1 | 10/2001 | Miyashita et al. | |
| 7,309,110 B2 | 12/2007 | Vernet et al. | |
| 9,340,066 B2 | 5/2016 | Mueller et al. | |
| 9,539,855 B2 * | 1/2017 | Werner | B29C 70/34 |
| 2005/0062338 A1 | 3/2005 | Vernet et al. | |
| 2011/0316323 A1 * | 12/2011 | Hendel | B60B 1/06 |
| | | | 301/63.101 |
| 2014/0246895 A1 | 9/2014 | Mueller et al. | |
| 2014/0333121 A1 * | 11/2014 | Hufenbach | B29C 70/462 |
| | | | 301/63.107 |
| 2014/0333122 A1 * | 11/2014 | Werner | B29C 70/34 |
| | | | 301/95.102 |
| 2014/0346845 A1 * | 11/2014 | Renner | B60B 3/004 |
| | | | 301/37.42 |
| 2014/0368025 A1 | 12/2014 | Pellicano et al. | |
| 2016/0332391 A1 * | 11/2016 | Werner | B29C 70/34 |

FOREIGN PATENT DOCUMENTS

| | | | |
|---|---|---|---|
| CN | 103963314 | * | 8/2014 |
| DE | 2914556 A1 | | 11/1979 |
| DE | 4129733 A1 | | 3/1992 |
| DE | 102010010512 A1 | | 9/2011 |
| DE | 102011083834 A1 | | 4/2013 |
| DE | 102011120361 A | | 6/2013 |
| EP | 0799722 A1 | | 10/1997 |
| EP | 2607097 A1 | | 6/2013 |

* cited by examiner

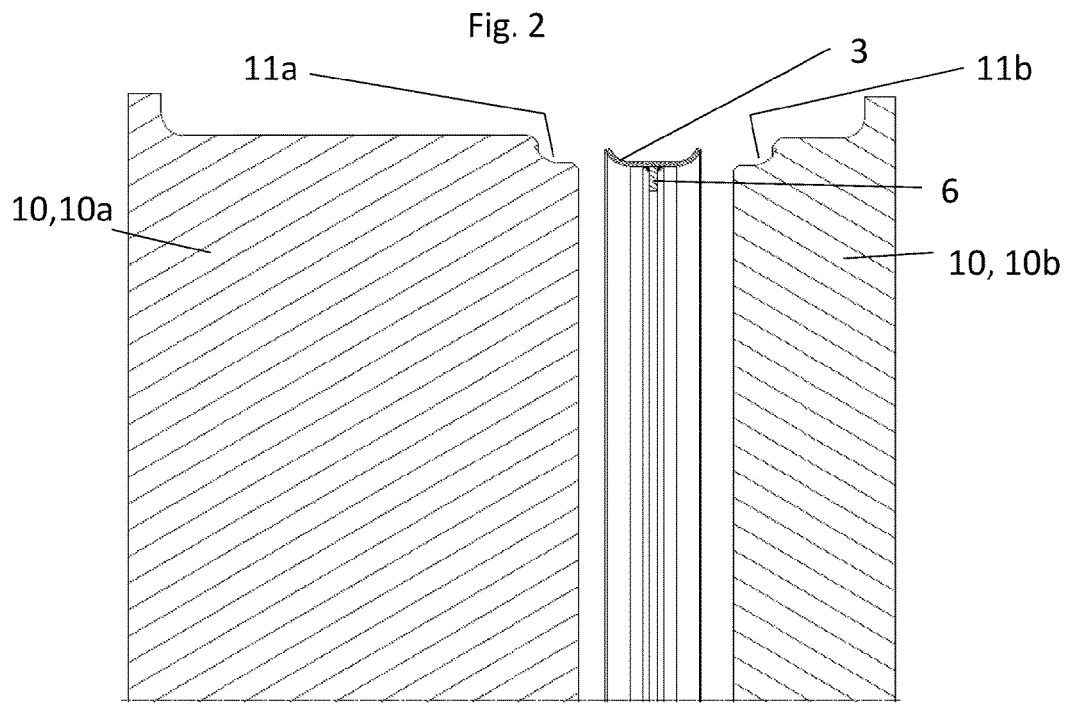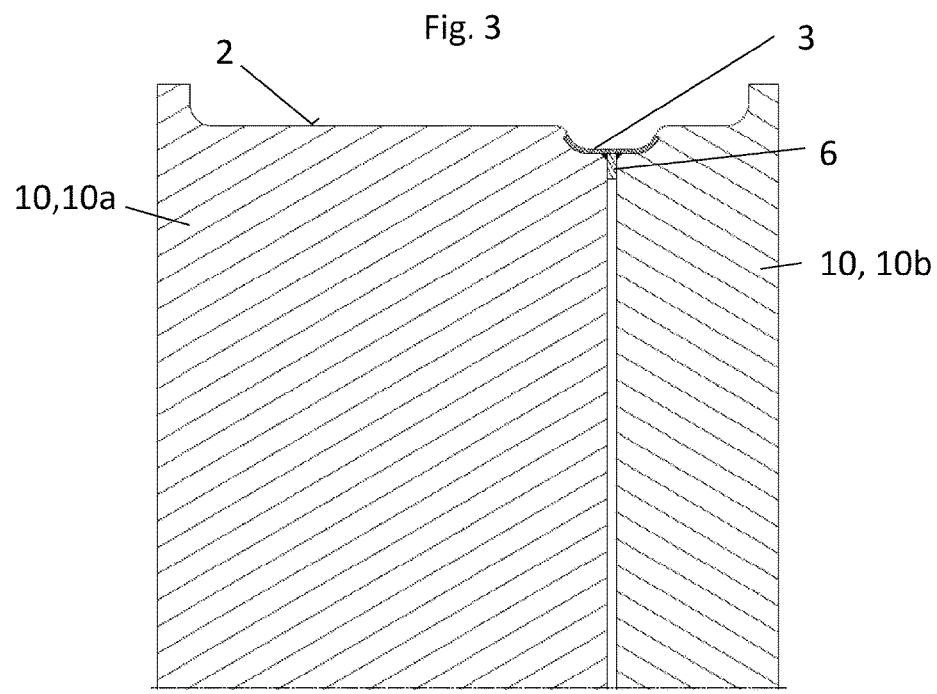

METHOD FOR PRODUCING A WHEEL RIM WITH A RIM BASE OF FIBER COMPOSITE MATERIAL

BACKGROUND OF THE INVENTION

1. Field of the Invention

The invention relates to a method for producing a wheel rim with a rim base made from fiber composite material.

2. Discussion of Background Information

Wheel rims of this type are components of multi-part lightweight (construction) wheels in particular for motor vehicles. The lightweight wheels essentially have, in addition to the wheel rim, a wheel disc made from fiber composite material or from any other material; the latter are also called lightweight-hybrid wheels. The wheel discs of the lightweight wheels are mostly designed to be plate-shaped or star-shaped, whereby the plate-shaped wheel discs may have closed or open spoke areas.

The known manufacturing methods for producing multi-part wheels, in particular using a hybrid construction method, are complex and/or costly. The connection created between the wheel rim and the wheel disc during production does not, in some cases, achieve the desired operational reliability despite the technological effort involved.

From printed publication DE 10 2010 010 512 A1, a method is known for manufacturing a component with a hollow profile, in particular a wheel rim, in which, during the production of the rim base from fiber composite material, a wheel disc is connected to the latter by means of a positive-fit and firmly bonded connection.

During the fabrication of the preform of the rim base, the wheel disc is integrated into the moulding tool for the rim base manufacture and connected in a positive-fit manner with the rim base. In the subsequent consolidation process, the preform of the rim base is infiltrated with matrix material and, under heat treatment, the rim base given a firmly bonded connection to the wheel disc.

This method requires complex tool systems in order, from a process engineering point of view, to integrate the wheel disc into the rim base production process. Changes to the geometry of the wheel disc have a crucial impact on the design of the moulding tool and require, to a large extent, new moulding tools, which is why design flexibility involves high production costs.

When using the method to manufacture, in particular, hybrid wheels with metallic wheel discs, the material of the wheel disc is subject to a high thermal load as a result of the production temperatures. Owing to the differing expansion properties of the materials of rim base and wheel disc, undesired internal stresses may be produced in the components, or inaccuracies of fit arise in the manufactured wheel.

SUMMARY OF THE INVENTION

The problem underlying the invention is therefore to improve, while eliminating the disadvantages of the prior art, the production of the wheel rim, in particular, to ensure reliably functioning wheel constructions with minimal financial and technical outlay.

The problem is solved by a connecting element connected to the rim bed during production, whereby the connecting element is designed and arranged in such a way that a wheel disc can be attached to the connecting element.

In accordance with the method according to the invention, the connecting element may for example be attached to a fabricated preform of the rim base, which is subsequently infiltrated with matrix material.

Alternatively, the connecting element is attached to a preform (Prepeg) of the rim base that has already been impregnated. In both cases, in the subsequent consolidation process the rim base is hardened under heat treatment in the hot tool, and in the process glued and firmly bonded to the connecting element. Subsequently, a wheel disc may be connected to the connecting element attached to the rim base using normal joining technologies.

Hence a (pre)fabricated unit of a wheel rim is provided for independent assembly of individual wheel discs outside of the production and joining process of the rim base.

Through the process-integrated connection of a connecting element to the rim base made of fiber composite material, the advantages of the tried-and-tested, firm and reliable joining to the rim base are utilised; here, over and above this, the wheel disc can, —flexibly—without particular consideration of the design and the material properties of the fiber composite material of the rim base, consist of any materials and be attached to the connecting element using all normal and established joining techniques (soldering, welding, riveting, screwing, gluing, pressing in).

The mounting of the wheel disc can take place independently of and technologically detached from the production process for manufacture of the wheel disc, which results in further advantages during the production of the wheel.

Thus the wheel disc is itself separated from the process of process-integrated joining during the manufacture of the rim base from fiber composite material and above all spared from the mechanical, chemical and in particular thermal loads which arise through the process-integrated joining with the rim base made of fiber composite material, in particular when consolidation occurs together.

The unfavourable internal stresses and inaccuracies of fit, observed as disadvantageous in the prior art, which may appear as a result of differing expansion and shrinkage behaviour of, in particular, metallic wheel discs in combination with the rim base made of fiber composite material during the direct integrated manufacturing process and in the subsequent cooling phase, are significantly reduced by the method according to the invention.

Owing to the lower mass and rigidity of the connecting element vis-à-vis a wheel disc, the differing expansion and shrinkage behaviour of the rim base in combination with, in particular, a metallic connecting element, generates fewer tensions in the rim base.

The mounting of the wheel disc onto the prefabricated wheel rim can occur separately, at room temperature, as a result of which likewise tensions in the wheel construction are reduced.

Preferably the connecting element has at least one connecting surface which is designed and arranged so as to correspond to one—or in each case one—connecting surface of the wheel disc.

During the attachment of the wheel disc to the connecting element, the connecting surface (s) of the wheel disc are only in contact with the corresponding connecting surface of the connecting element.

The flow of force during operation of the wheel is therefore from the rim base solely via the connecting element into the wheel disc and vice versa.

As a result of this, possible applications also present themselves in which the connecting element connected to the rim base performs various useful separation functions of the wheel vis-à-vis the rim base.

Thus signs of expansion during operation of the wheel disc are absorbed solely by the connecting element and can, when transmitted to the rim base, be better compensated for.

In an advantageous embodiment of the method, the connecting element is associated with a mould of the rim base during the fabrication of a preform of the rim base, and connected to the preform, preferably in a positive-fit manner.

The preform is fabricated through fiber material being deposited on a moulding tool. In the process the connecting element is associated with the mould of the rim base in the form of a layer or lining and, during deposition of the fiber material on the mould and the associated connecting element, connected to the preform formed hereby. Preferably, this occurs while forming undercuts through inclusions of the contour of the connecting element in the fiber material, whereupon a secure, positive-fit connection is produced.

Subsequently, the preform is infiltrated with matrix material and hardened under heat treatment in the hot tool, whereby the rim base is firmly bonded to the connecting element.

Through the process-integrated, positive-fit and firmly bonded connection between a connecting element and the rim base made of fiber composite material, the advantages of a particularly firm and reliable connection to the rim base are preserved and are utilised for the subsequent attachment of the wheel disc and for the finished wheel construction.

This advantageous design of the method according to the invention reduces, furthermore, the outlay involved in manufacturing the wheel rim, since for the most part uniform moulding tools can be used which, besides the rim base, only model the connecting element to be integrated, which relative to the wheel disc can be designed delicately and with a virtually universal design.

Changes to the geometry of the wheel disk have a less cost-intensive impact on the moulding tools, which permits, with minimal outlay, greater flexibility when designing the wheel disc.

A particularly advantageous embodiment of the method envisages that a material is used for the connecting element which has a thermal coefficient of expansion that is at least similar (in relation) to the thermal coefficient of expansion of the fiber composite material of the rim base.

During the consolidation of the rim base and the connection to the connecting element, the components are strongly heated and collectively expanded. As a result of the similar-to-identical expansion properties of rim base and connecting element, the expansion and also shrinkage during the subsequent cooling can take place to the same extent and tension-free. Thereby process-related, internal stresses in the rim base and/or process-related inaccuracies of fit between the rim base and the connecting element can for the most part be avoided and the distribution of tension in the connection improved.

Expansion properties similar-to-identical to those of the fiber composite material are found for example in special steel alloys such as the steel alloys known by the name Invar® or Pernifer®.

This design of the wheel rim according to the invention is also advantageous during operational use of the finished wheel, because under a thermal load (e.g. from brake heat) acting on the wheel, there is approximately equal thermal expansion behaviour of the connecting element and the rim base. As a result of the approximately equal expansion behaviour of connecting element and rim base, compensatory deformation of the two components is achieved, as a result of which tensions in the rim base which could lead to cracks in the fiber composite material of the rim base are avoided.

If the wheel is subjected to a load, tension is only generated between the wheel disc and the connecting element, whereby the load-bearing connecting element performs thermal expansion compensation. By this means, the load on the wheel construction can be additionally reduced.

Advantageously, the connecting element is connected to the rim base in the area of the well of the rim base. Thereby, through this arrangement alone, a position of the connecting element in relation to the rest of the inner contour of the rim base is created where it projects internally in the rim cavity of the rim base, which makes it possible, by simple means, to provide the connecting surface for connection of the wheel disc offset and at a certain distance from the remaining inner contour of the rim base. The rim cavity of the wheel rim is formed by the inner contour of the rim base that goes all the way round, whereby the well narrows the inner rim cavity.

In a preferred embodiment, it is envisaged that the connecting element is designed and arranged so as to extend in the rim cavity of the wheel rim.

Thus a partial protrusion of the connecting element which overhangs the rim base on the inside is created, with the result that one or more connecting surfaces which are offset in relation to the inner contour of the rim base and point and/or extend into the rim cavity can be provided for the connection of the wheel disc, which increases the diversity of attachment options and the reliability of the connection of the wheel disc.

As a result, in particular, of the connecting surfaces extending into the rim cavity and pointing in a diagonal or lateral direction, additional support of the wheel disc in an axial direction is enabled, which ensures a homogeneous distribution of the load being applies to the rim base.

The wheel disc can, e.g. through a reliable clamp or screw connection, be tensioned in an axial direction against the lateral connecting surfaces of the connecting element.

In this way, the forces resulting from the operational thermal expansion of the wheel disc can for the most part, through frictional locking on the corresponding lateral connecting surfaces between the wheel disc and the loading-bearing connecting element, be transmitted to the connecting element.

The inwardly directed protrusion of the connecting element also offers the advantage of being able to arrange the wheel disc using simple means in a position that is not in contact with the rim base and is subjected to little load.

In this way the wheel disc can be attached at a sufficient distance away that it only contacts the connecting element and is also—even under the thermal expansion during operational use of the wheel—only supported against the connecting element.

The flow of force when the wheel is in operation is therefore from the rim base solely via the connecting element into the wheel disc and vice versa.

By this means, unfavourable frictional locking of the wheel disc with the rim base and hence vibratory-rubbing wear on the fiber composite material is avoided. The connection between wheel disc and wheel rim becomes subject to less wear and more reliable under the operating conditions.

If the inwardly directed connecting element is connected to the preform during the fabrication of the preform of the rim base, then the connecting element may be associated with the moulding tool for example by being arranged between two spaced parts of the moulding tool of the rim base, so that the contour of the connecting element, which is offset in relation to the contour of the rim base, can be positioned so that it is directed inwards.

This arrangement brings about, even as early as during the collective joining of the rim base to the connecting element, the stipulated protrusion of the connecting element that projects beyond the inner contour of the rim base.

If the connecting element is associated with an appropriate recess of the moulding tool during fabrication of the preform of the rim base then it is possible, by simple means, to arrange the connecting element in such a way that the protrusion of the connecting element is formed opposite the inner contour of the rim base.

The connecting element with the design and production according to the invention may, if particular materials are used, assume additional separation functions which shield the rim base mechanically, chemically or thermally from the wheel disc.

Preferably the connecting element is formed from glass fiber-reinforced plastic (GRP). This material has good adhesive properties, low rigidity and high strength in relation to its weight. The material enters a very good positive-fit bond with the fiber composite material of the rim base, facilitates lightweight construction and ensures a secure attachment of the wheel disc to the connecting element.

As a result of the low rigidity of the GRP, the connecting element has a low deformation resistance, which, during the heat treatment in the integrative production process of the rim base, also has a tension-reducing effect.

A high thermal resistance of the GRP also ensures that the connecting element can compensate well for the heat input into the rim base resulting from for example joining techniques involving a thermal load during attachment of the wheel disc or operationally generated brake heat of the wheel disc, and hence that tensions in the rim base can be reduced.

With a further advantageous embodiment, an intermediate layer is formed between the rim base and the connecting element.

The intermediate layer may be applied for example during the fabrication for formation of the preform of the rim base before the fiber deposition on the connecting element.

The intermediate layer can be glued to the rim base and the connecting element to give a firmly bonded connection either before or during the consolidation of the fiber composite material of the rim base.

Alternatively, the contact surface of the connecting element facing the rim base can be coated before the manufacture of the rim base, in particular before the joining of the connecting element to the rim base. By means of coating, particularly thin layers can be applied.

In this way, the intermediate layer can be integrated, with minimal effort and high strength, into the wheel rim between the rim base and the connecting element.

This intermediate layer can alternatively or in combination with the connecting element assume special separation functions which shield the rim base mechanically, chemically or thermally from the wheel disc during production of the wheel construction and also during operation, and increase the freedom of choice when choosing material for the connecting element or wheel disc.

Alternatively or additionally, an intermediate layer is formed on the connecting surface of the connecting element.

Preferably the connecting surface of the connecting element is coated with the intermediate layer. The coating of the connecting surface can take place independently of the production of the rim base.

The intermediate layer is, in one advantageous embodiment, formed from a material which has a greater thermal resistance than the thermal resistance of the material of the connecting element. An intermediate layer from a material with such a high thermal resistance as e.g. an intermediate layer made of an elastomer, of glass fiber-reinforced plastic (GRP) or ceramic, generates thermal resistance which inhibits the transmission of production-related or operational heat loads onto the rim base, which also reduces damage to the fiber composite material and reduces tensions in the rim base.

By means of such an intermediate layer—appropriately arranged—heat input from the wheel disc onto the rim base, which occurs e.g. through thermal joining techniques—such as welding—for attachment of the wheel disc to the metallic connecting element, can in particular be compensated for well.

An intermediate layer made from an elastomer or from GFK can be designed as an adhesive layer between the rim base and the connecting element, whereby the elastomer and the GRP stand out for good adhesive properties which bring about a firm material connection of the intermediate layer to the rim base and the connecting element.

GRP in particular is suitable as a material for the intermediate layer as a result of the favourable weight/strength ratio, which means that insulating intermediate layers with larger layer thicknesses can also be executed without a problem.

If the connecting element is formed from a material which has a larger thermal resistance relative to the thermal resistance of the material of the wheel disc to be connected, the same advantageous effects can also be achieved; in particular, through the process engineering-related provision, the rim base can be favourably protected from subsequent thermal loads from the brake heat acting during operation of the wheel.

These and further features apparent from the patent claims, the description of the embodiments and the drawings can, in each case for themselves or in combination, be put into practice as advantageous embodiments of the invention for which protection is being claimed here.

BRIEF DESCRIPTION OF THE DRAWINGS

The method according to the invention shall be explained in more details below using embodiments. The associated drawings show, in schematic representation, the following FIG. 1 a partial sectional view of a wheel rim produced in accordance with the invention with a ring-shaped connecting element and a wheel disc attached to it, FIG. 2 a partial sectional view of a two-part moulding tool and the ring-shaped connecting element in a first production phase of the wheel rim in accordance with FIG. 1, FIG. 3 a partial sectional view of the tool unit with the associated, ring-shaped connecting element in a second production phase of the wheel rim in accordance with FIG. 1, FIG. 4 a partial sectional view of the tool unit with the enclosed, ring-shaped connecting element in a third production phase of the wheel rim in accordance with FIG. 1, FIG. 5 a partial sectional view of the finished wheel rim with the connected ring-shaped connecting element in accordance with FIG. 1, FIG. 6 an isometric view of the wheel rim in accordance with FIG. 1 with the wheel disc to be connected, FIG. 7 a partial sectional view of a wheel rim produced in accordance with the invention according to a second embodiment with a ring-shaped connecting element in a second design and a wheel disc connected to it, FIG. 8 a partial sectional view of a two-part moulding tool and of the ring-shaped connecting element in accordance with FIG. 7 of the wheel rim in accordance with FIG. 7

DETAILED DESCRIPTION OF EMBODIMENTS

Figure 1:
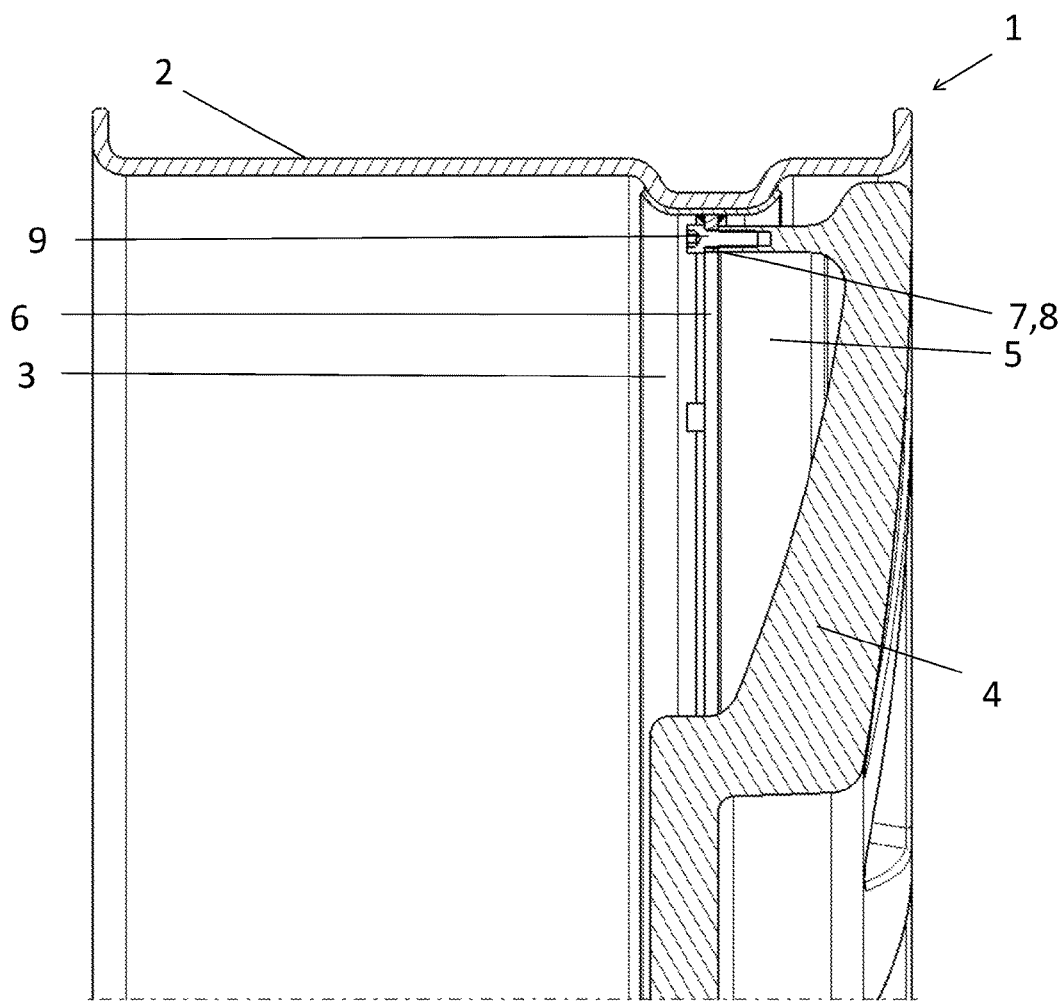

Visible from FIG. 1 is a wheel rim 1 produced in accordance with the invention according to a first embodiment with a rim base 2 made from carbon fiber-reinforced plastic (CRP) and a ring-shaped connecting element 3 made of stainless steel that is connected to the rim base 2 during production of the rim base 2. Subsequently a plate-shaped wheel disc 4 with an open spoke area and a spoke ring 5 made of aluminium is attached to the connecting element 3 of wheel rim 1. FIG. 1 shows the end state of a wheel assembly with the wheel disc 4 attached to the wheel rim 1 in accordance with the invention. The connecting element 3 has a flange ring 6 going all the way round and extending inwards in a radial direction into the rim cavity of wheel rim 1, with whose (the flange ring's) lateral connecting surface 7 pointing in an axial direction the front face 8 of the spoke ring 5 of the wheel disc 1 can be brought into contact and the spoke ring 5 can be joined by means of several fastening screws 9 distributed over the circumference.

The wheel rim 1 with the ring-shaped connecting element 3 is provided as a (pre) fabricated unit for connection of wheel discs, which may be of any shape and material, in any manner. By way of an alternative to the wheel disc 1 according to this embodiment, it is also possible to e.g. attach star-shaped wheel discs with spoke ends or wheel discs made of steel or fiber composite material.

As an alternative to the screw connection described, the wheel disc 1 can be e.g. riveted, welded or soldered to the connecting element 3 or pressed into the connecting element 3.

In order to achieve a firm connection between the wheel disc 4 and the rim base 2, instead of the wheel disc 4 the inventive connecting element 3 is integrated into the production process for manufacture of the rim base 2 and firmly connected to the rim base 2 during the manufacture of the rim base 2.

The wheel disc 4 is only indirectly attached to the rim base 2, without the wheel disc 4 being affected by the production of the rim base 2 and without the rim base 2 being affected by the attachment of the wheel disc 4, as a result of which production-related tensions in the wheel construction are considerably reduced.

FIGS. 2 to 5 depict different manufacturing phases of the production, in accordance with the invention, of the wheel rim in accordance with FIG. 1.

In a first manufacturing phase in accordance with FIG. 2, a two-part moulding tool 10 for the manufacture of a preform of the rim base 2 and the ring-shaped connecting element made of stainless steel fabricated with the flange ring are provided. The sub-tools 10a, 10b of the moulding tool 10 each model a part of the contour of the rim base 2 and have a suitable recess 11a, 11b corresponding to the contour of the prefabricated, ring-shaped connecting element 3.

Subsequently, the ring-shaped connecting element 3 with the flange ring 6 is associated with the sub-tools 10a, 10b and the sub-tools 10a, 10b joined together placing the connecting element 3 in between. FIG. 3 shows the position of the connecting element 3 in relation to the moulding tool 10. The connecting element 3 is arranged in an area in which the well of the rim base 2 is shaped and models, on a surface facing the rim base 2, the inner contour of the well. The flange ring 6, extending inwards in a radial direction, with the connecting surface 7, is arranged in a remaining space in between the sub-tools 10a, 10b pointing inwards in a radial direction.

Figure 4:
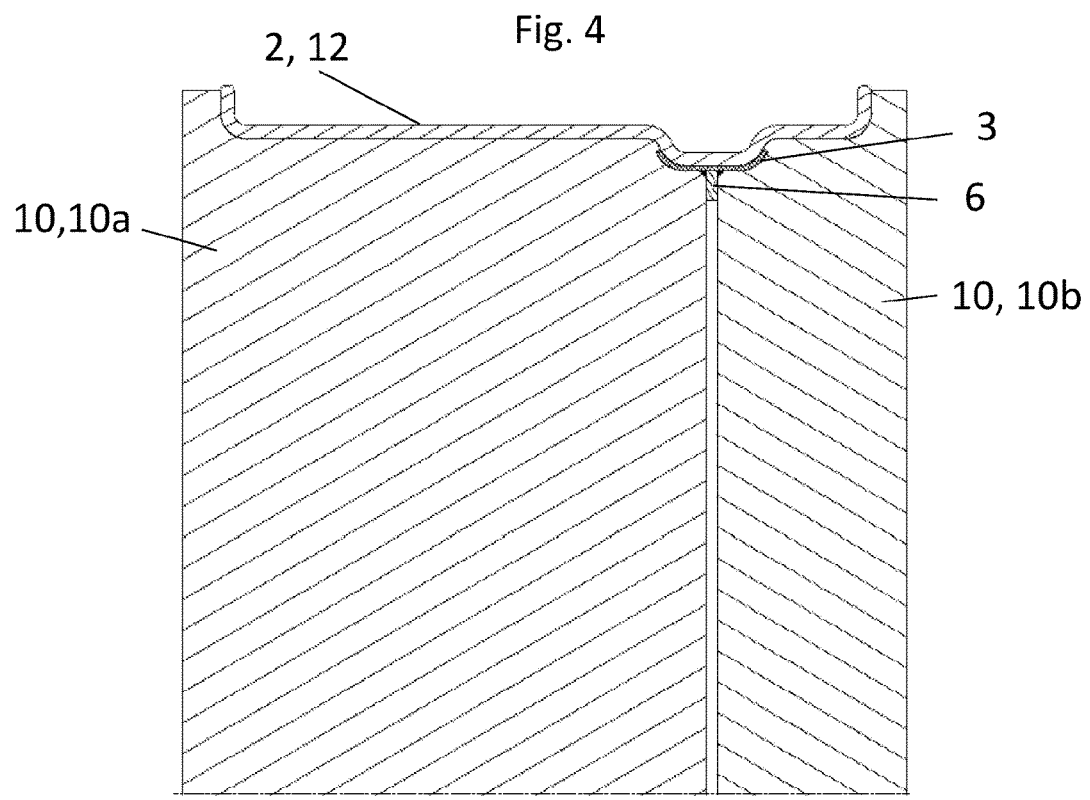

In the subsequent manufacturing phase in accordance with FIG. 4 the preform of the rim base 2 is produced, during which—as applicable rotating the moulding tool 10—fiber material 12 is deposited, through winding or plaiting, on the contour of the moulding tool 10 and the connecting element 3. This produces an undercut of the fiber material 12 in the area of the well, by means of which the connecting element 3 surrounds the well that is formed and thus is connected to the preform of the rim base 2 in a positive-fit manner. FIG. 4 shows the described position of the connecting element 3 in relation to the rim base 2. In this intermediate stage of production, the wheel rim 1 is completed, stably formed and capable of being demoulded.

The intermediate product of the wheel rim 1 demoulded from the moulding tool 10 is, for the purpose of completion of the wheel rim 1, impregnated with matrix material and hardened by means of heating, e.g. in a heating furnace (not shown).

Figure 5:
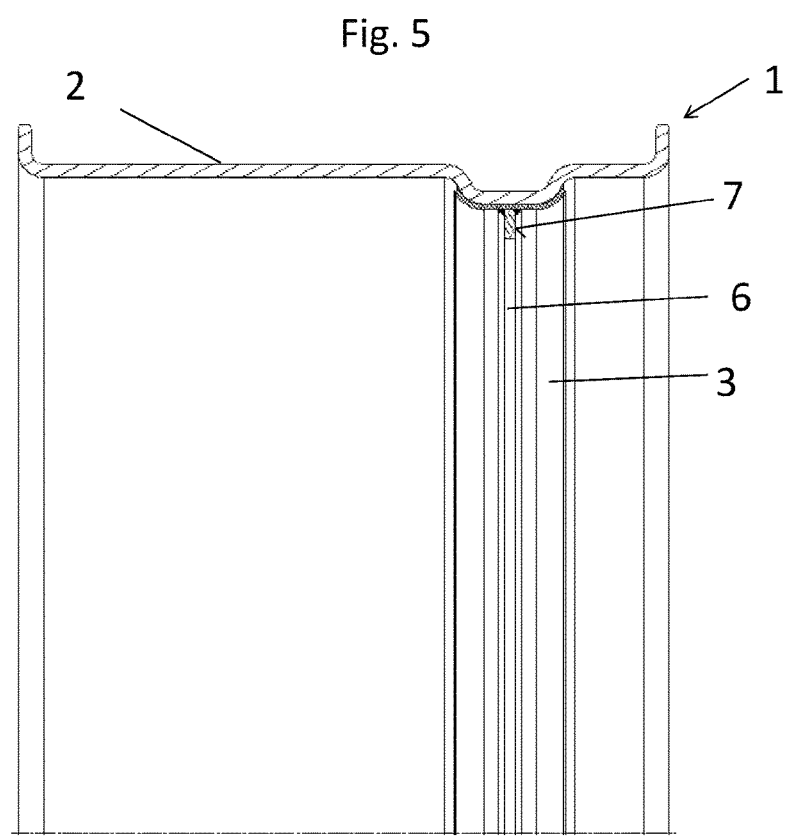

FIG. 5 shows the completed wheel rim 1 in accordance with FIG. 1, which has the ring-shaped connecting element 3 which is connected in a positive-fit and firmly bonded manner with the rim base 2 made of CRP 3. The connecting element 3 is connected to the rim base 2 in such a way that it encloses the well of the rim base 2 and is offset in relation to the inner contour of the rim base 2. For the subsequent connection of the wheel disc 4 to the wheel rim 1, the flange ring 6 which extends into the rim cavity with the connecting surface 7, pointing in an axial direction, is provided.

Through the process-integrated, positive-fit and firmly bonded connection of the connecting element 3 to the rim base 2, a particular firm and reliable connection with the rim base 2 is achieved and available for the subsequent attachment of the wheel disc 4 and for the finished wheel construction. The design of the wheel rim 1 created through the process enables a non-contact connection in relation to the rim base 2 and also a non-contact arrangement of wheel disc 4 vis-à-vis the rim base 2.

The same moulding tool 10 can also be used for the integration of similarly designed connecting elements which e.g. have an alternative flange ring (not shown) or no flange ring.

The moulding tool 10 is in all cases independent of the geometry and attachment of the wheel disc 4 to be connected.

The connecting element 3 integrated in the manufacturing process has a significantly lower mass and rigidity compared with the wheel disc 4 to be connected. The result of this is that the connecting element 3, in the face of the differing expansion of the rim base 2 and the connecting element 3 occurring during the highly tempered heat treatment in accordance with FIG. 4 and the differing shrinkage occurring in the subsequent cooling phase, exerts less force on the rim base 2 than is the case with a process-integrated joining with a compact wheel disc. The connecting element 3, owing to its low rigidity, offers the rim base 2 less resistance during the expansion and shrinkage process, which leads to lower tensions in the rim base than is the case with a wheel disc integrated in the production process.

In addition, the connecting element 3 in accordance with this embodiment consists of stainless steel with a particular steel alloy, namely of Pernifer®. This material has an almost identical coefficient of expansion to the CRP of the rim base This results in the expansion of the rim base 2 and the connecting element 3 during the heat treatment and the shrinkage of both components during subsequent cooling being of the same proportion and hence free from tension.

Internal stresses in the rim base 2 or inaccuracies of fit between the rim base 2 and the connecting element 3 through the collective joining do not, for the most part, occur.

The ring-shaped design of the connecting element 3 additionally improves the distribution of tension in the connection generated between rim base 2 and connecting element 3.

Figure 6:
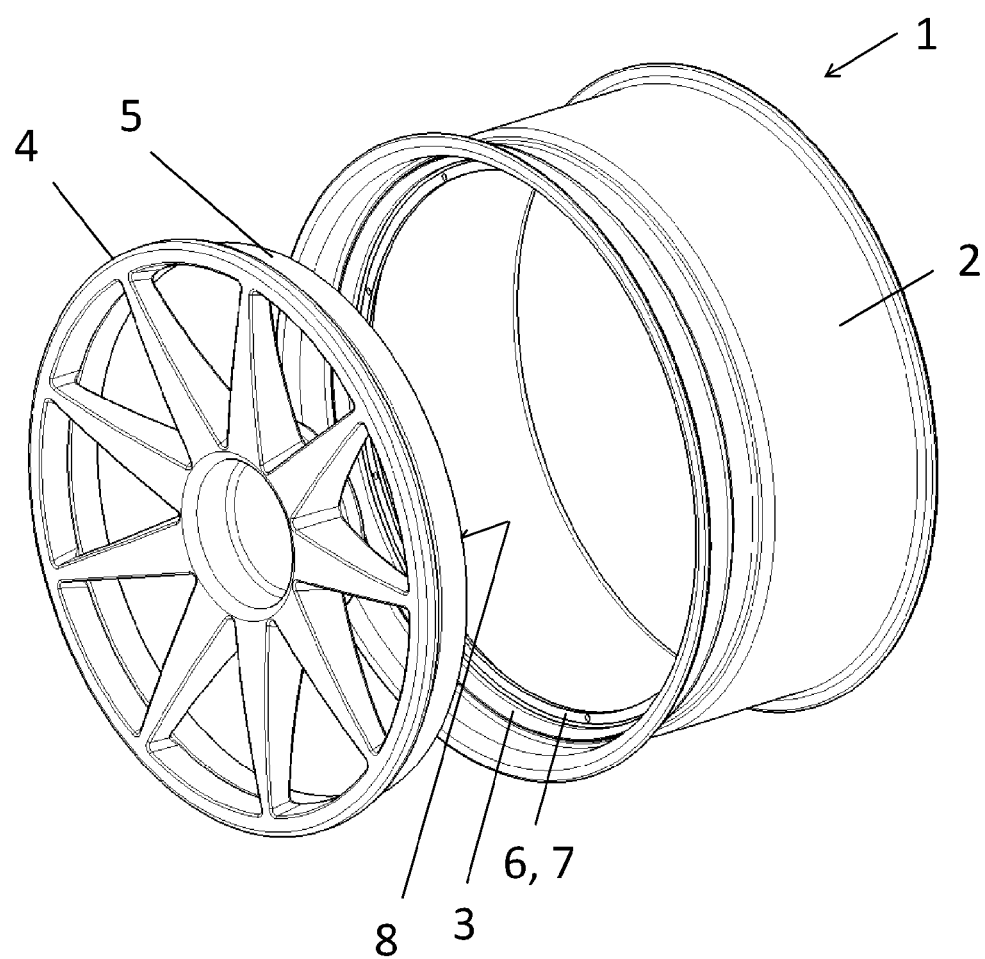

FIG. 6 shows, in an isometric view, the completed wheel rim 1 with the connecting element in accordance with FIG. 1, to which the wheel disc 4 is attached by applying the front face 8 of the spoke ring 5 to the connecting surface 7 of the flange ring 6 and through a subsequent screw connection with the connecting element 3.

During the attachment of the wheel disc 4 to the connecting element 3, only the front face 8 of the spoke ring 5 contacts with the connecting surface 7 of the connecting element 3. The flange ring 6 with the connecting surface 7 is arranged so as to extend inwards in a radial direction into the rim cavity of the wheel rim 1 and thus additionally facilitates the mounting of the wheel disc 4 (cf. also FIG. 1).

Figure 7:
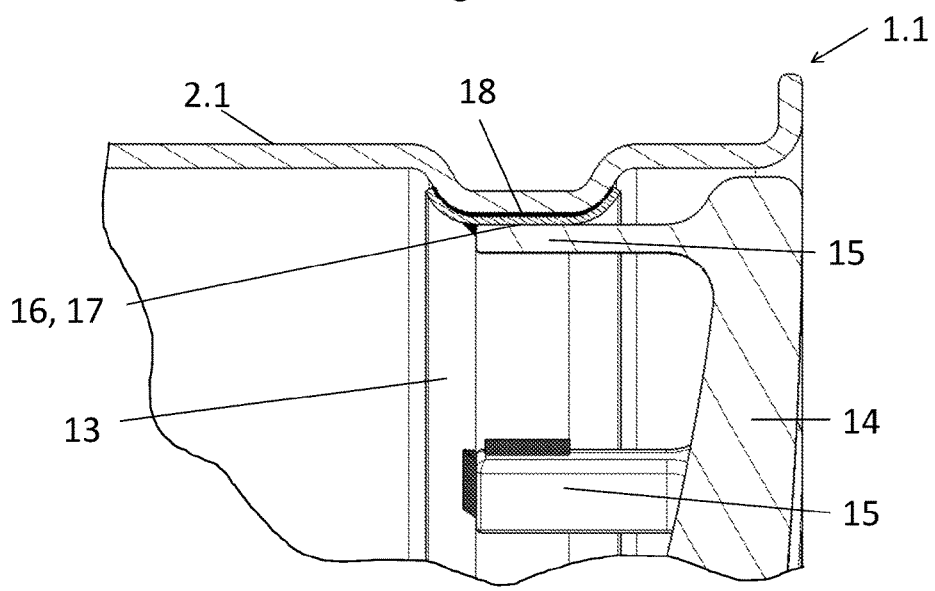

In the partial sectional view in accordance with FIG. 7, a wheel rim 1.1 completed in accordance with the inventive method according to a second embodiment is shown. The wheel rim 1.1 has a rim base 2.1 made of CFK and a ring-shaped connecting element 13 made of Pernifer® as per FIG. 1, but without a flange ring. In the same way as the inventive method according to the previously described embodiment, the connecting element 13 is likewise, during the manufacture of the rim base 2.1, connected to the latter.

In the following, only the differences compared with the method according to the previously described embodiment in accordance with FIGS. 1 to 6 shall be outlined.

To the ring-shaped connecting element 13 of the wheel rim 1.1 in accordance with FIG. 7 is attached a star-shaped wheel disc 14 with spoke ends 15 made of aluminium. The outer edges 16 of the spokes 15 are in contact with a connecting surface 17, which points inwards in a radial direction into the rim cavity and goes all the way round, of the connecting element 13, whereby each spoke end 15 is attached to the connecting surface 17 through weld joints formed on three sides.

In a further difference from the previously described embodiment, the connecting element 13 is integrated flush into the well of the rim base 2.1, so that it is directly adjacent, with no indentations, to the inner contour of the rim base 2.1. The connecting surface 17 formed in the area of the well is, as a result of its position, arranged so as to be offset inwards from the rest of the inner contour of the rim base 2.1.

Between the rim base 2.1 and the surface of the connecting element 13 facing the rim base 2.1, an intermediate layer 18 made of ceramic is provided, which is constructed as a coating of the surface of the connecting element 13 facing the rim base 2.1.

Figure 8:
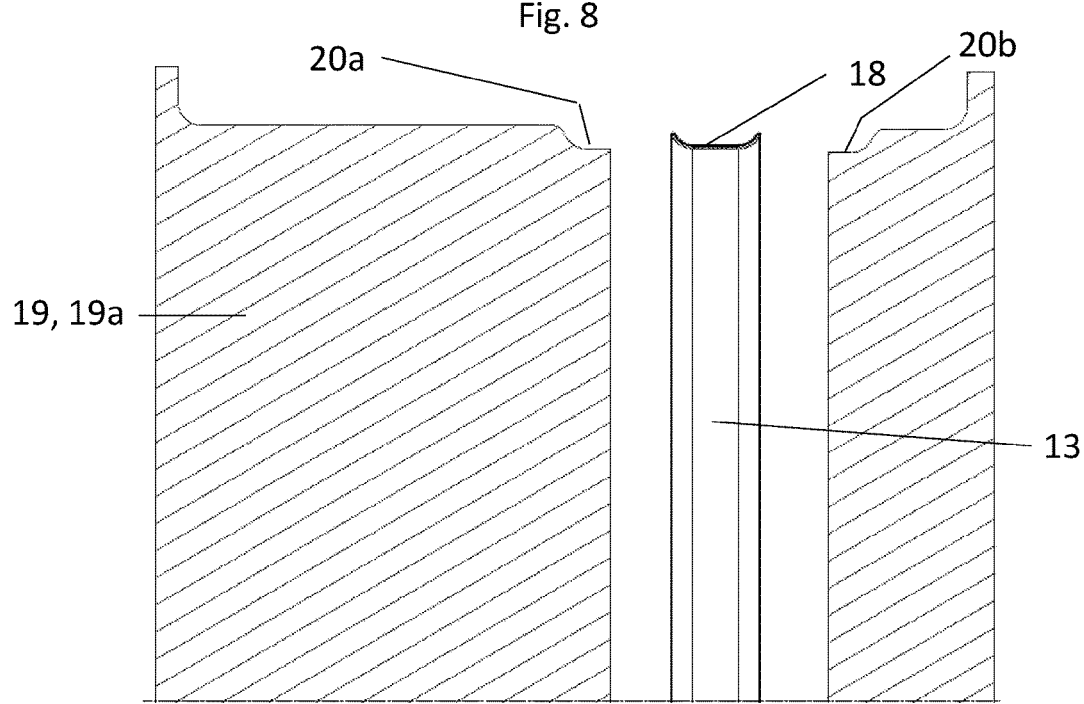

FIG. 8 shows the sub-tools 19a, 19b of the moulding tool 19 and the ring-shaped connecting element 13 coated with the intermediate layer 18 of ceramic. The sub-tools 19a, 19b in each case, a part of the contour of the rim base 2.1 and have a suitable recess 20a, 20b according to the contour of the fabricated, ring-shaped connecting element 13 in such a way that the surface of the connecting element 13 facing away from the rim base 2.1 is adjacent, with no indentations, to the inner contour of the rim base 2.1. that is to be formed.

Figure 9:
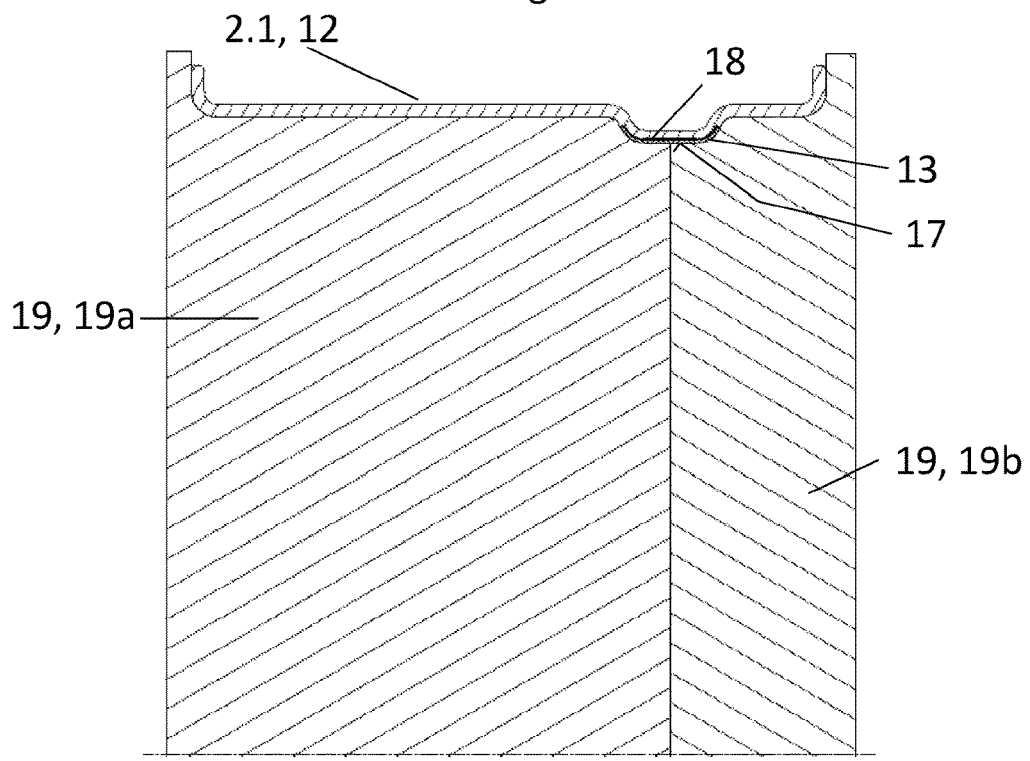
FIG. 9 a partial sectional view of the tool unit with the enclosed, ring-shaped connecting element in an advanced production phase of the wheel rim in accordance with FIG. 7, FIG. 10 a partial sectional view of the finished wheel rim with the connected ring-shaped connecting element in accordance with FIG. 7, FIG. 11 a partial sectional view of a wheel rim produced in accordance with the invention according to a third embodiment with a ring-shaped connecting element in a third design and a wheel disc connected to it, FIG. 12 a partial sectional view of a wheel rim produced in accordance with the invention according to a fourth embodiment with a multi-part connecting element and a wheel disc connected to it, FIG. 13 a partial sectional view of a wheel rim produced in accordance with the invention according to a fifth embodiment with a ring-shaped connecting element in a fourth design and a wheel disc connected to it, FIG. 14 a partial sectional view of a wheel rim produced in accordance with the invention according to a sixth embodiment with ring segment-shaped connecting elements and a connected wheel disc, FIG. 15 an isometric view of a two-part moulding tool and the ring segment-shaped connecting elements for the production of the wheel rim in accordance with FIG. 14

In the depicted production phase in accordance with FIG. 9, the sub-tools 19a, 19b of the moulding tool 19 are, for the manufacture of the preform of the rim base 2.1, joined together with the coated ring-shaped connecting element 13 being inserted in between. FIG. 9 shows the described position of the connecting element 13 in relation to the moulding tool 19 and to the rim base 2.1.

The connecting element 13 is arranged in the area of the well of the rim base 2.1 to be formed, whereby the connecting element 13 with the connecting surface 17 pointing inwards in a radial direction simultaneously forms and bounds the inner contour of the well. On the contour of the moulding tool 19 and the connecting element 13 with the intermediate layer 18, the fiber material 12 is deposited, forming positive-fit undercuts. The ring-shaped connecting element 13 with the intermediate layer 18 surrounds and bounds on the one side the well that is formed and on the other is enclosed in its periphery by the fiber material 12.

Figure 10:
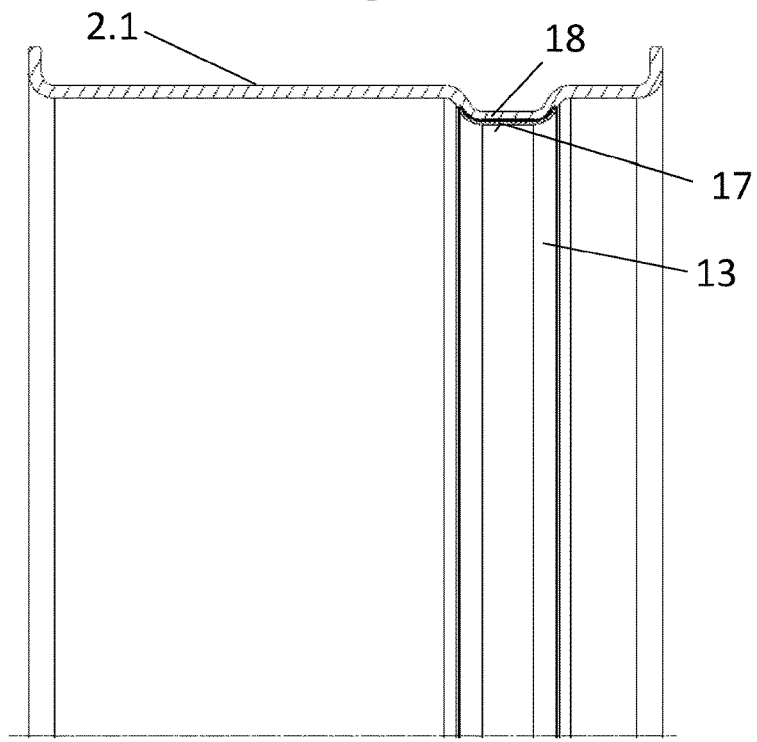

FIG. 10 shows the preform of the rim base 2.1 demolded from molding tool 19 with the integrated, coated connecting element 13. To complete the wheel rim 1.1 in accordance with FIG. 7, the preform is impregnated with matrix material and hardened. In the process, the coated connecting element 13 is firmly glued to the rim base 2.1.

With the method according to the second embodiment, the advantages already outlined for the previous embodiment likewise occur.

The planar connecting surface 17 pointing inwards in a radial direction 17 enables the universal attachment of different types of wheel discs using different joining techniques such as soldering, welding, gluing or pressing in.

In addition, when the star-shaped wheel disc 14 according to this embodiment is attached, a particular advantage of the intermediate layer 18 comes into effect. The intermediate layer 18 made of ceramic has a significantly higher thermal resistance than the connecting element 13 made of stainless steel. The heat input exerted on the connecting surface 13 through the envisaged welding-on of the spoke ends 15 onto the connecting element 13 has, as a result of the intermediate layer 18, barely any impact on the rim base 2.1 and thereby reduces subsequently generated tensions in the rim base 2.1 (cf. FIG. 7)

Figure 11:
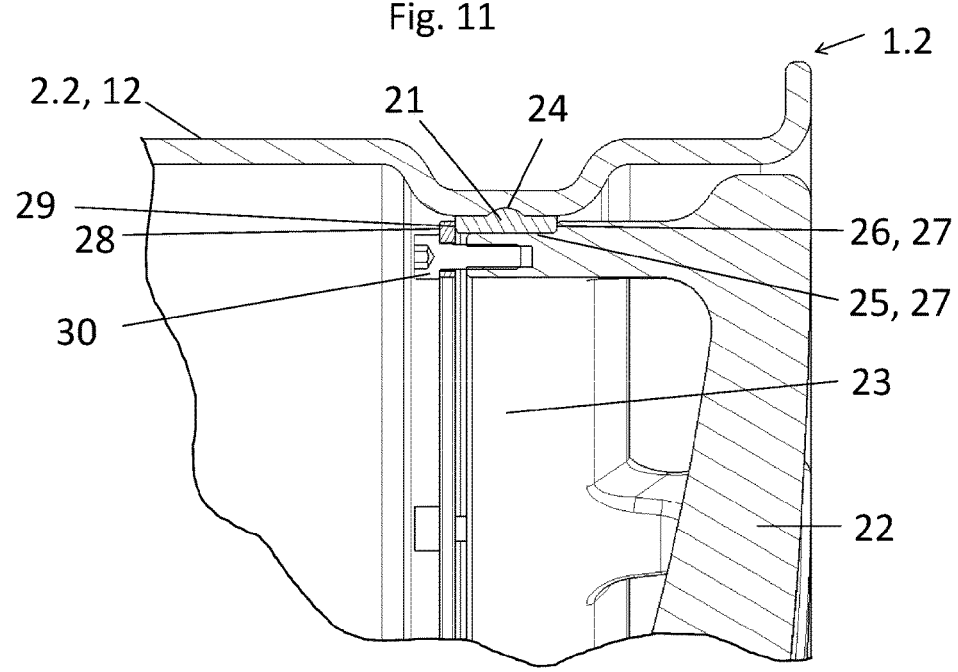

In a third embodiment in accordance with FIG. 11, a further wheel rim 1.2 completed in accordance with the inventive method is shown. The wheel rim 1.2 has a rim base 2.2 made of CRP and a ring-shaped connecting element 21 made of glass fiber-reinforced plastic (GRP), which, during the manufacture of the rim base 2.2, is connected to the latter.

In the following, only the differences from the method according to the first embodiment as per FIGS. 1 to 6 shall be described.

To the ring-shaped connecting element 21 of the wheel rim 1.2 in accordance with FIG. 11 is attached a plate-shaped wheel disc 22 with an open spoke field and spoke ring 23 made of aluminium.

In a further difference from the embodiment in accordance with FIGS. 1 to 6, the ring-shaped connecting element 21 made of GRP has an essentially rectangular ring cross section with a curve 24 all the way round, whereby the connecting element 21 is arranged in the area of the well in relation to the rim base 2.2 in such a way that the ring cross section of the connecting element 21 extends inwards in a radial direction into the rim cavity and projects significantly beyond the inner contour of the rim base 2.2 and in particular of the well. Attached to the connecting element 21 is a connecting surface 25 that points inwards in a radial direction and goes all the way round and a connecting surface 26 that goes all the way round and essentially extends in a radial direction and points in an axial direction.

Hence the wheel disc 22 can be connected by means of a clamped connection with the wheel rim 1.2, or with the ring-shaped connecting element 21. A recess 27 of the spoke ring 23 of the wheel disc 22 that corresponds to the contour of the connecting surfaces 25, 26 and goes all the way round is brought in contact with the connecting surface 25 which in each case goes all the way round and points inwards in a radial direction and with the connecting surface 26 of the connecting element 21 that points in an axial direction. A clamping ring 28 made of aluminium is arranged on the stop face 29, pointing in an opposing axial direction, of the connecting element 21, and tensioned with several fastening screws 30 distributed over the circumference of the wheel rim 1.2 with the spoke ring 23 against the connecting element 21. The connecting element 21 made of GRP has a very high strength in relation to its weight, which is ideally suitable for the clamped connection.

In order to manufacture the rim base 2.2, the connecting element 21 is placed in an appropriate recess of a two-part moulding tool (not shown). The curve 24 formed in the connecting element 21 creates, during the deposition of the fiber material 12 on the contour of the moulding tool and the connecting element 21, an undercut which surrounds the curve 24 of the connecting element 21 that goes all the way round and connects the connecting element 21, initially in a positive-fit manner, with the preform of the rim base 2.2.

Subsequently in the process, the CRP of the rim base 2.2 is connected to the GRP of the connecting element (not shown) on the contact surfaces of the rim base (2.2) and of the connecting element 21, whereby, owing to the good adhesive properties of the GRP, a particularly firm adhesion is achieved.

Additionally, the high strength and low rigidity of the connecting element 21 made of GRP enable a reduction in the tension during the joint heat treatment in the rim base 2.2 manufacturing process.

Through this version of the method according to the invention, likewise a process-integrated, positive-fit and firmly bonded connection of the connecting element 21 to the rim base 2.2 with a particularly firm and reliably connection is achieved and a solid, secure connection option made available for the subsequent clamped connection of the wheel disc 22.

The high thermal resistance of the connecting element 21 made of GRP compared with the wheel disc 22 made of aluminium also reduces the effect of heat from the attached wheel disc 22 on the rim base during operation of the wheel.

Figure 12:
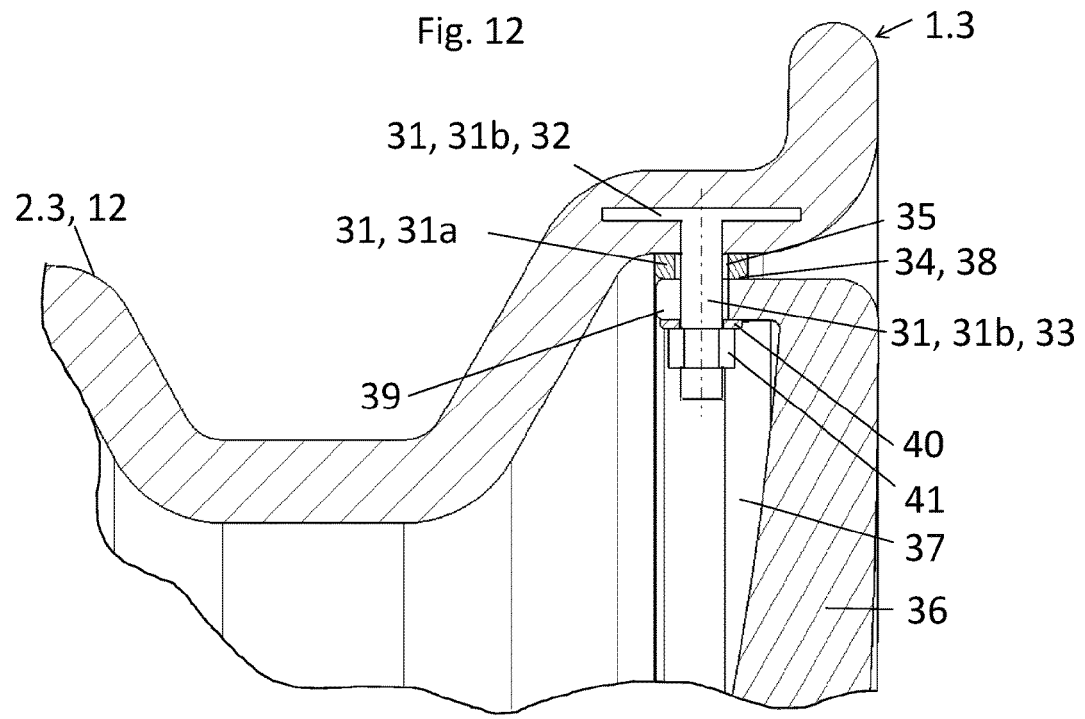

FIG. 12 shows sections of a wheel rim 1.3 produced in accordance with the invention according to a fourth embodiment. The wheel rim 1.3 has a rim base 2.3 made of CRP and a multi-part connecting element 31 which, during the manufacture of the rim base 2.3, is connected to the latter.

In the following, only the differences vis-à-vis the method according to the embodiment as per FIG. 11 shall be addressed.

The multi-part connecting element 31 consists of a ring component 31a, designed to go all the way round, made of GRP, and for example ten individual pin components 31b made of Pernifer® arranged distributed around the circumference of the wheel rim 1.3. The pin components 31b in each case have a plate-shaped head 32 and a shaft 33 with a screw thread constructed at the shaft end. The pin components 31b are associated with the rim base 2.3 in such a way that the heads 32 of pin components 31b extend in a tangential orientation in the rim base 2.3 whilst the shafts 33 are directed into and extend into the rim cavity Similar to the ring-shaped connecting element 21 in accordance with FIG. 11, the ring component 31a made of GRP has an essentially rectangular ring cross section and is arranged on the rim base 2.3 so as to extend inwards in a radial direction into the rim cavity. On the ring component 31a, a connecting surface 34 is constructed which points inwards in a radial direction and goes all the way round.

Unlike the ring-shaped connecting element 21 in accordance with FIG. 11, the ring component 31a has openings 35 corresponding to the number of pin components 31b, which are penetrated by the shafts 33 of the pin components 31b that are directed inwards in a radial direction so that these project beyond the internal diameter of the ring component 31a.

In a further difference from the embodiment in accordance with FIG. 11, the multi-part connecting element 31 is connected to the rim base 2.3 in the area of the tyre seating.

To the ring component 31a and the shafts 33 of the pin components 31b of the multi-part connecting element 31, a particularly large wheel disc, in the current embodiment a large plate-shaped wheel disc 36 with an open spoke area and spoke ring 37 made of aluminium, can be attached.

On the connecting surface 34 pointing inwards in a radial direction, an outer shell 38 of the spoke ring 37 of the wheel disc 36 that corresponds all the way around the circumference is fitted.

The spoke ring 37 has ten slots 39 that correspond to the number and arrangement of the shafts 33 of the pin components 31b, whereby during the mounting of the wheel disc 36 a shaft 33 of the pin components 31b is received by each slot 39. The size of the slot 39 brings about a spaced positioning of the shaft 33 of the pin component 31b in relation to the spoke ring 37 of the wheel disc 36.

The shaft ends of the shafts 33 are in each case equipped with a washer 40 and a nut 41 and the screw connection between the wheel disc 36, the ring component 31a and the pin components 31b tensioned.

The ring component 31a and the pin components 31b are joined directly with the rim base 2.3 in a positive-fit and firmly bonded manner during the fabrication of the preform of the rim base 2.3.

For the manufacture of the preform of the rim base 2.3, the ring component 31a made of GRP is inserted into a corresponding recess of a two-part moulding tool of the rim base 2.3 (not shown), whereby the ring component 31a is positioned in the area of the tyre seating—to be formed—of the rim base 2.3 and the surface of the ring component 31a which is facing the rim base 2.3 adjoins, flush, the inner contour of the rim base 2.3 that is to be formed.

From the contour, going all the way round, of the closed moulding tool equipped with the ring component 31a, fiber material 12 is deposited in a similar way to the previous embodiment and initially a first fiber layer of the fiber material 12 formed.

After this the pin components 31b are inserted into the first fiber layer so that their heads 32 lie on the first fiber layer and their shafts 33 protrude through the existing openings 35 of the ring component 31a. The recess for the ring component 31a in the moulding tool is formed with recesses corresponding to the number, arrangement and shape of the shafts 33, which means that the shaft ends of the inserted pin components 31b are received by the recess (not shown).

On the first fiber layer and the heads 32 of the pin components 31b a second fiber layer of the fiber material 12 is deposited (not shown), until the desired thickness of the rim base 2.3 has been achieved.

Here the pin components 31b are covered and enclosed by the fiber material 12. Through the large surface of the heads 32, a distinct tight fit of the pin components 31b is achieved with the preform of the rim base 2.3.

In the subsequent part of the process, the fiber material 12 of the preform is infiltrated with matrix material and the bond consisting of the preform, the ring component 31a and the pin components 31b hardened, whereby the ring component 31a made from GFK and the pin components 31b made of Pernifer® are glued to the rim base 2.3 made of CRP.

As a result of the approximately equal expansion and shrinkage behaviour of the rim base 2.3 made of CRP and the integrated pin components 31b made of Pernifer® during the joint heat treatment, process-related tensions in the rim base 2.3 are avoided.

The specifically constructed contact surfaces between the ring component 31a and the rim base 2.3 and between the pin components 31b and the rim base 2.3 ensure a particularly material-saving and simultaneously sturdy positive-fit and firmly-bonded connection of the multi-part connecting element 31 to the rim base 2.3. By way of support, the very good adhesive properties of the GRP provide a particularly firm connection between the ring component 31a and the rim base 2.3.

In addition, the low rigidity of the ring component 31a made of GRP reduces the tensions resulting during the joint heat treatment from the expansion and shrinkage behaviour relative to the rim base 2.3.

Through this design of the method according to the invention, a particularly efficient connection of the multi-part connecting element 31 to the rim base 2.3 is provided as a basis for a solid screw connection between the wheel disc and the wheel rim 1.3.

The arrangement of the connecting surfaces 34, 38 extending in a radial direction enables a particularly even distribution of pressure of the tension generated through the screw connection of the wheel disc 36 and the wheel rim 1.3.

The introduction of force from the screw connection into the wheel rim 1.3 is directly into the pin components 31b integrated in the rim base 2.3, as a result of which the ring component 31a is placed under less stress and can be designed so as to be correspondingly weight-minimized.

The high thermal resistance of the ring component 31a made of GRP vis-à-vis the wheel disc 36 made of aluminium reduces the impact of heat from the attached wheel disc 36 to the rim base 2.3 during operation of the wheel.

Figure 13:
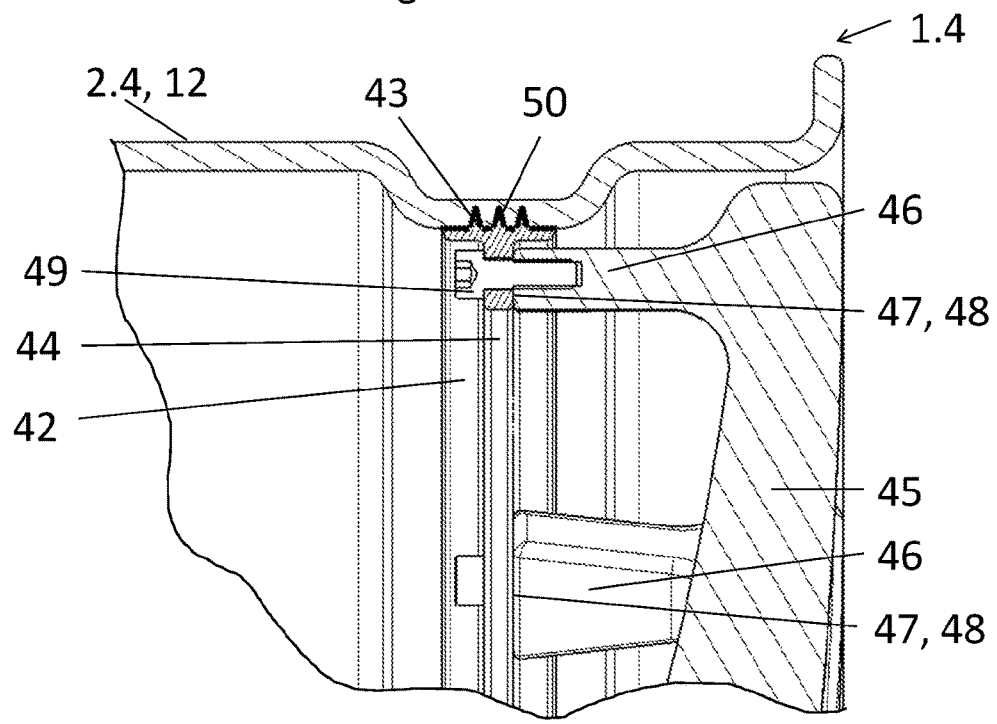

FIG. 13 shows sections of a wheel rim 1.4 produced in accordance with the invention according to a fifth embodiment. The wheel rim 1.4 has a rim base 2.4 made of CRP, which is connected to a ring-shaped connecting element 42 made of steel with pin elements 43 extending outwards in a radial direction into the rim base 2.4.

In the following, only the differences from the method according to the embodiment as per FIG. 11 shall be addressed.

To a flange ring 44, extending inwards in a radial direction into the rim cavity, of the ring-shaped connecting element 42 of the wheel rim 1.4 in accordance with FIG. 13, is attached a star-shaped wheel disc 45 with spoke ends 46 made of aluminium. The front faces 47 of the spoke ends 46 contact with the connecting surface 48, which extends in a radial direction and points in an axial direction, of the flange ring 44; by means of fastening screws 49 the spoke ends 46 are connected to the connecting element 42.

For the manufacture of the rim base 2.4 and for the simultaneous attachment of the connecting element 42, the ring-shaped connecting element 42 is inserted into corresponding recesses of a two-part moulding tool (not shown). Here the pin elements 43, which are splayed in a radial direction, of the connecting element 42 protrude distinctly into the fiber layer 12 of the preform and, during the fiber deposition of the fiber material 12 on the contour of the moulding tool and the connecting element 42, enclosed on all sides. Through the large surface of the pin elements 43 a very marked tight fit of the connecting element 42 and the preform of the rim base 2.4 is achieved.

The pin elements 43 are coated with an intermediate layer 50 made of Teflon. By this means, the fibers 12 that are to be deposited can slide more easily into the gaps between the pin elements 43 so that the fiber deposition in this area is reliable and compact.

Subsequently in the process, the preform of the rim base 2.4 is, as previously described, infiltrated and hardened, whereby the Teflon layer 50 produces a decoupling of the adhesion vis-à-vis the pin elements 43. The flow of force with this connection is via the marked tight fit of the rim base 2.4 with the pin elements 43 as a solely supporting element.

Through this design of the method in accordance with the invention, a process-integrated, positive-fit attachment of the connecting element 42 to the rim base 2.4 with a particularly sturdy and reliable connection is achieved and available for the subsequent attachment of the wheel disc 45.

Figure 14:
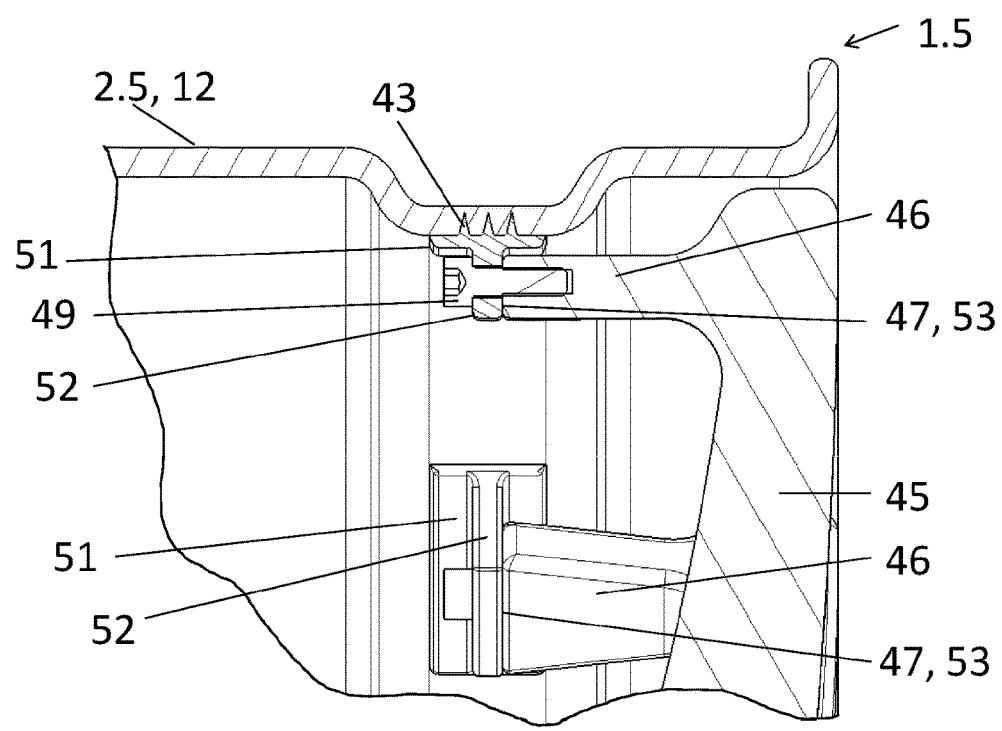

In an alternative design to the wheel rim 1.4 in accordance with FIG. 13, FIG. 14 shows a wheel rim 1.5 with several connecting elements 51 which, like the ring-shaped connecting element 42 in accordance with FIG. 13, have pin elements 43 extending outwards in a radial direction and, during the manufacture of the rim base 2.5, are attached to the latter.

Unlike the previously described embodiment the connecting elements 51 are designed to be ring segment-shaped and arranged distributed over the circumference of the wheel rim 1.5. The star-shaped wheel disc 45 with spoke ends 46 made of aluminium is to be attached to the connecting elements 51 as per the embodiment in accordance with FIG. 12, whereby the connecting elements 51 are provided in the number and arrangement to correspond to the spokes 46 of the wheel disc 45 to be connected.

The connecting elements 51 have flange bars 52 that extend inwards in a radial direction into the rim cavity to which the spoke ends 46 of the star-shaped wheel disc 45 are attached.

The spoke ends 46 are, with their front faces 47, in each case brought into contact with a lateral connecting surface 53, pointing in an axial direction, of the flange bars 52 and connected by means of the fastening screws 49 to the connecting elements 51 and thereby with the wheel rim 1.5.

Figure 15:
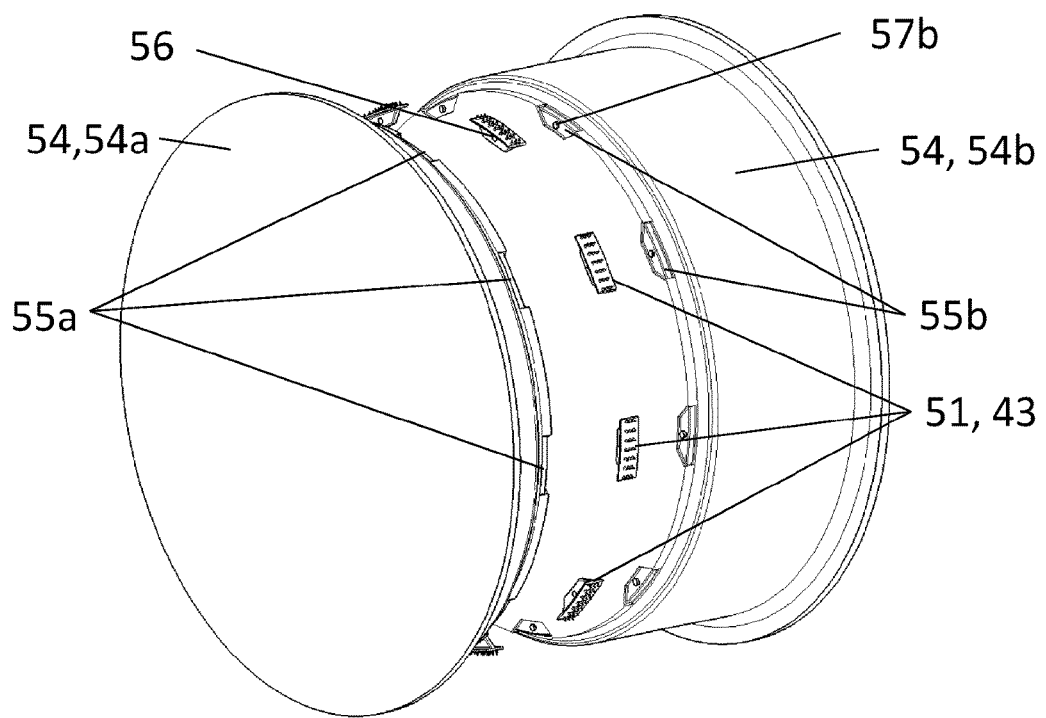

FIG. 15 shows, in an isometric view, the sub-tools 54*a*, 54*b* of the moulding tool 54 for manufacture of the preform of the rim base 2.5 and the individual ring segment-shaped connecting elements 51 immediately before being coordinated with the appropriate recesses 55*a*, 55*b* of the sub-tools 54*a*, 54*b*. In the closed state of the sub-tools 54*a*, 54*b* (not shown) the connecting elements 51 are tightly enclosed, whereby the surface of the connecting elements 51 facing the rim base 2.5 with the pin elements 43 is associated with the contour of the rim base.

The connecting elements 51 have, in each case, a drilled hole 56 introduced prior to the joining process for the screw connection of the wheel disc 45. Accordingly, additionally provided in the recesses 55*a*, 55*b* of the sub-tools 54*a*, 54*b* are corresponding mould studs 57*a*, 57*b* to cover the drilled holes 56 and for securing the connecting elements 51.

This design of the method according to the invention makes it possible to integrate several individual connecting elements 51 into the rim base 2.5 and to connect them reliably with the latter. Hereby, while ensuring the strength, weight-minimised and visually particularly inconspicuous compounds are made available for connecting, in particular, star-shaped wheel discs 45.

Figure 16:
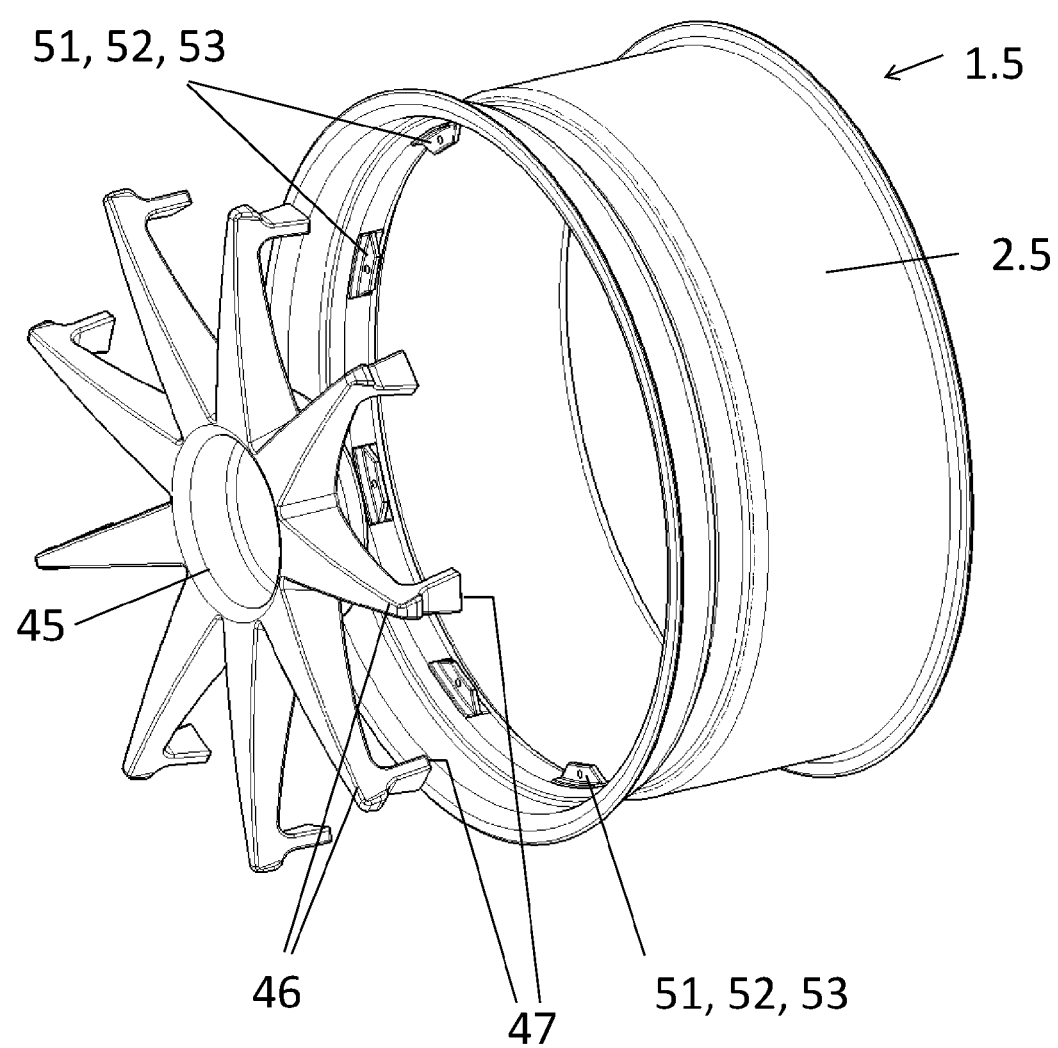
FIG. 16 an isometric view of the wheel rim in accordance with FIG. 14 with the wheel disc to be connected.

FIG. 16 shows, in an isometric view, the finished wheel rim 1.5 with the ring segment-shaped connecting element 51 in accordance with FIG. 14, to which the star-shaped wheel disc 45 is fastened by bringing the front faces 47 of the spoke ends 46 into contact with the lateral connecting surfaces 53, pointing in an axial direction, of the flange bars 52 and subsequent screw connection with the ring segment-shaped connecting elements 51.

LIST OF REFERENCE NUMBERS

1 Wheel rim 1.1, 1.2, 1.3, 1.4 1.5
2 Rim base 2.1, 2.2, 2.3, 2.4 2.5
3 Ring-shaped connecting element
4 Plate-shaped wheel disc with spoke ring
5 Spoke ring
6 Flange ring extending in a radial direction
7 Connecting surface of the connecting element pointing in an axial direction
8 Front face of spoke ring
9 Fastening screws
10 Moulding tool, sub-tool a, b
11 Recess a, b
12 Fiber material
13 Ring-shaped connecting element
14 Star-shaped wheel disc with spoke ends
15 Spoke, spoke end
16 Edge of spoke
17 Connecting surface pointing inwards in a radial direction
18 Intermediate layer
19 Moulding tool, sub-tool a, b
20 Recess
21 Ring-shaped connecting element
22 Plate-shaped wheel disc with spoke ring
23 Spoke ring
24 Curve of connecting element
25 Connecting surface pointing inwards in a radial direction
26 Connecting surface pointing in an axial direction
27 Recess of spoke ring
28 Clamping ring
29 Stop surface pointing in an axial direction
30 Fastening screw
31 Multi-part connecting element, ring component a, pin component b
32 Head of pin component
33 Shaft of pin component
34 Connecting surface pointing inwards in a radial direction
35 Opening
36 Plate-shaped wheel disc with spoke ring
37 Spoke ring
38 Outer shell of spoke ring
39 Slot
40 Washer
41 Nut
42 Ring-shaped connecting element with pin elements
43 Pin elements
44 Flange ring extending in a radial direction
45 Star-shaped wheel disc with spoke ends
46 Spoke end
47 Front face of spoke end
48 Connecting surface pointing in an axial direction and going all the way round
49 Fastening screw
50 Intermediate layer
51 Ring segment-shaped connecting element
52 Flange bar extending in a radial direction
53 Connecting surface pointing in an axial direction
54 Molding tool, sub-tools a, b
55 Recess
56 Drilled hole
57 Mold stud

What is claimed is:

1. A method for the manufacture of a wheel rim, wherein the wheel rim comprises a rim base of fiber composite material and the method comprises connecting a connecting element to the rim base during the manufacture of the rim base, the connecting element including a connecting surface, the connecting element being designed and arranged to connect to a wheel disc solely by way of the connecting surface.

2. The method of claim 1, wherein during fabrication of a preform of the rim base the connecting element is associated with a mold of the rim base and is connected to the preform.

3. The method of claim 2, wherein the connecting element is connected to the preform in a positive-fit manner.

4. The method of claim 1, wherein a material which has a thermal coefficient of expansion which is at least similar to a thermal coefficient of expansion of the fiber composite material of the rim base is used as the connecting element.

5. The method of claim 1, wherein the connecting element is connected to the rim base in an area of a well of the rim base.

6. The method of claim 1, wherein the connecting element is designed and arranged so as to extend into a rim cavity of the wheel rim.

7. The method of claim 2, wherein the connecting element is associated with a corresponding recess of a molding tool.

8. The method of claim 4, wherein the connecting element is associated with a corresponding recess of a molding tool.

9. The method of claim 5, wherein the connecting element is associated with a corresponding recess of a molding tool.

10. The method of claim 6, wherein the connecting element is associated with a corresponding recess of a molding tool.

11. The method of claim 1, wherein the connecting element is formed from fiber-reinforced plastic (GRP).

12. The method of claim 1, wherein an intermediate layer is formed in a joining area between the rim base and the connecting element.

13. The method of claim 1, wherein an intermediate layer is formed on a connecting surface of the connecting element.

14. The method of claim 12, wherein the intermediate layer is formed from a material which has a thermal resistance that is greater than a thermal resistance of the material of the connecting element.

15. The method of claim 13, wherein the intermediate layer is formed from a material which has a thermal resistance that is greater than a thermal resistance of the material of the connecting element.

16. The method of claim 1, wherein the connecting element is formed from a material which has a greater thermal resistance than a thermal resistance of the material of the wheel disc to be attached.

17. The method of claim 1, wherein during the manufacture of the rim base a multi-part connecting element is connected to the rim base.

18. The method of claim 1, wherein during the manufacture of the rim base several connecting elements are connected to the rim base.

19. The method of claim 18, wherein the several connecting elements are arranged around a circumference of the wheel rim.

* * * * *